United States Patent
Taguchi et al.

(10) Patent No.: US 9,183,631 B2
(45) Date of Patent: Nov. 10, 2015

(54) METHOD FOR REGISTERING POINTS AND PLANES OF 3D DATA IN MULTIPLE COORDINATE SYSTEMS

(75) Inventors: Yuichi Taguchi, Arlington, MA (US); Srikumar Ramalingam, Cambridge, MA (US); Yong-Dian Jian, Atlanta, GA (US); Chen Feng, Ann Arbor, MI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/539,060

(22) Filed: Jun. 29, 2012

(65) Prior Publication Data

US 2014/0003705 A1    Jan. 2, 2014

(51) Int. Cl.
*G06K 9/60* (2006.01)
*G06T 7/00* (2006.01)

(52) U.S. Cl.
CPC ............. *G06T 7/0032* (2013.01); *G06T 7/0046* (2013.01); *G06T 7/0071* (2013.01); *G06T 2207/10028* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 7,187,809 B2 * | 3/2007 | Zhao et al. | 382/285 |
| 8,306,684 B2 * | 11/2012 | Nakano | 701/23 |
| 2004/0167667 A1 * | 8/2004 | Goncalves et al. | 700/245 |
| 2007/0156286 A1 * | 7/2007 | Yamauchi | 700/245 |
| 2011/0205338 A1 * | 8/2011 | Choi et al. | 348/46 |
| 2012/0053728 A1 * | 3/2012 | Theodorus et al. | 700/259 |
| 2012/0196679 A1 * | 8/2012 | Newcombe et al. | 463/36 |
| 2012/0250978 A1 * | 10/2012 | Taylor | 382/154 |
| 2013/0278719 A1 * | 10/2013 | Rusert et al. | 348/43 |

FOREIGN PATENT DOCUMENTS

TW    200928570 A    7/2009

OTHER PUBLICATIONS

Wright et al, "Convex Hulls, Occluding Contours, Aspect Graphs and the Hough Transform," 1996, Image and Vision Computing 14, pp. 627-634.*
Plane (geometry) [online]. Wikipedia, 2014 [retrieved Feb. 25, 2014]. Retrieved from the Internet: < http://en.wikipedia.org/wiki/Plane_(geometry) >, p. 1.*
Besl et al, A Method for Registration of 3-D Shapes, 1992, IEEE Transactions on Pattern Analysis and Machine Intelligence, vol. 14, No. 2, pp. 239-256.*

(Continued)

*Primary Examiner* — Bhavesh Mehta
*Assistant Examiner* — David F Dunphy
(74) *Attorney, Agent, or Firm* — Dirk Brinkman; Gene Vinokur

(57) ABSTRACT

Three-dimensional data are registered by selecting a first set of primitives from the data in a first coordinate system, wherein the first set of primitives includes at least one plane, at least one point, and a third primitive that is either a point or a plane, and selecting a second set of primitives from the data in a second coordinate system, wherein the second set of primitives includes at least one plane, at least one point, and a third primitive corresponding to the third primitive in the first set of primitives. Then, the planes are registered with each other, as are the points, to obtain registered primitives.

20 Claims, 4 Drawing Sheets

(56) References Cited

OTHER PUBLICATIONS

Lee et al, A Prospective Algorithm for Real Plane Identification from 3D Point Clouds and 2D Edges, 2008, International Conference on Convergence and Hybrid Information Technology, IEEE, pp. 75-82.*

Jeffrey, Mathematics for Engineers and Scientists, 1996, Chapman & Hall, 5th Edition, vol. 1, p. 167.*

* cited by examiner

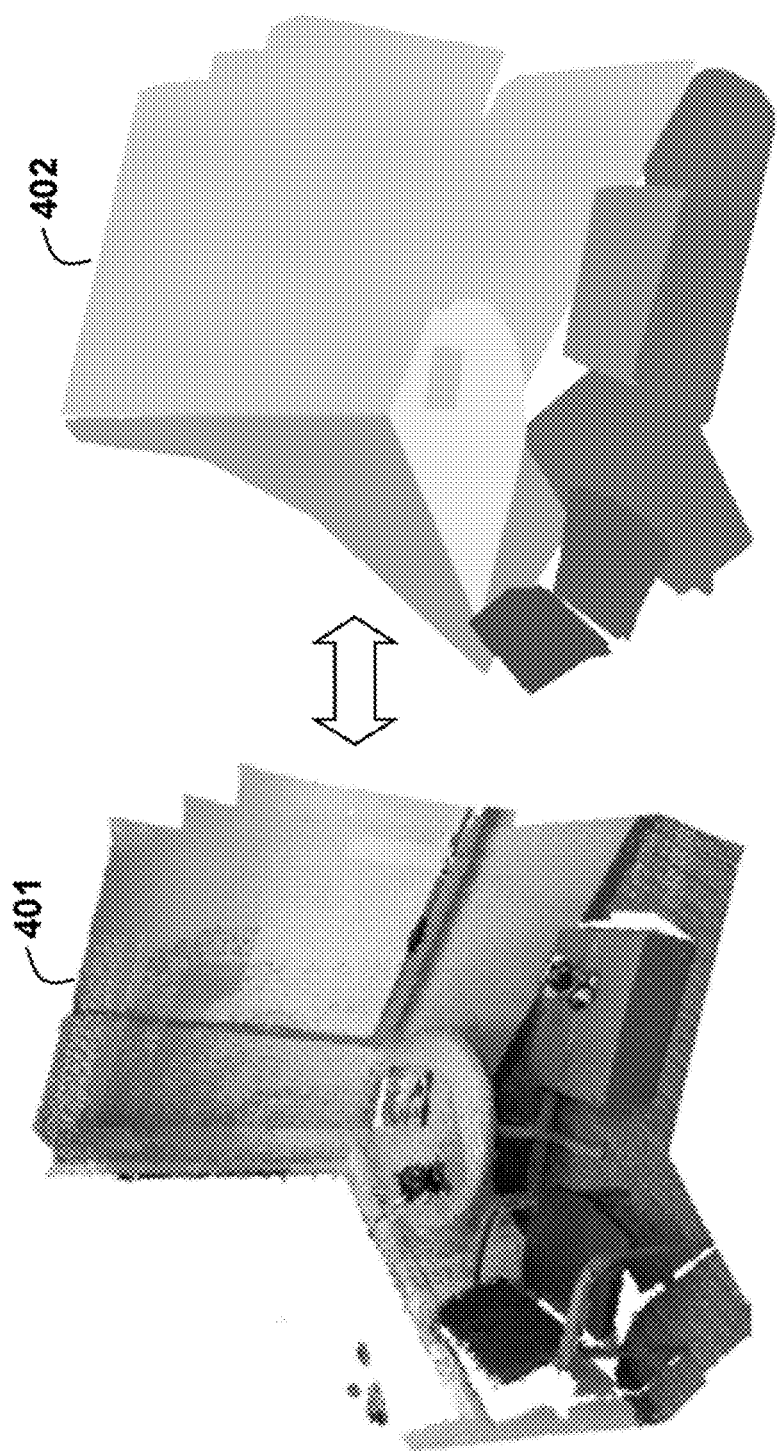

US 9,183,631 B2

METHOD FOR REGISTERING POINTS AND PLANES OF 3D DATA IN MULTIPLE COORDINATE SYSTEMS

FIELD OF THE INVENTION

This invention relates generally to registration of three-dimensional (3D) data, and more particularly to registering 3D points and 3D planes with each other for real-time reconstruction applications.

BACKGROUND OF THE INVENTION

3D Reconstruction

Interactive and real-time 3D reconstruction of a scene is used in a number of applications, e.g., robotics, augmented reality, medical imaging, and computer vision. Real-time sparse and dense 3D reconstruction can use passive sensors such as cameras. However, passive sensors have difficulties to reconstruct textureless regions.

For reconstructing textureless regions, active 3D sensors can be used. For example, the Kinect sensor for the Microsoft Xbox uses an IR pattern for acquiring 3D data as a depth map from a viewpoint of the sensor in real time.

Other issues relate to processing time, memory requirement, and accuracy. Because of the field of view and resolution, 3D sensors usually produce a partial reconstruction of a scene. It is desired to provide an accurate and fast registration method that can combine successive partial depth maps and a model of the scene. Inertial sensors are prone to drift. Therefore, the features in an RGB (texture) image or depth map need to be relied on for accurate registration. In addition, depth maps are usually noisy without any higher-level spatial constraint. Furthermore, the point cloud requires a very large memory, and is difficult to compress.

3D-to-3D Registration

Local

Alignment or registration of 3D data is a fundamental problem in computer vision applications, which can be solved using several methods. The registration methods can be local or global. The local methods should start with a good initialization, and register two 3D point clouds using relatively small iterative moves. This is similar to a non-linear minimization method that converges to a global solution with a good initial solution. The most common local method is an iterative closest point (ICP) method, which iteratively determines corresponding 3D points and the moves using a closed-form solution.

Global

Global methods typically consider the entire 3D point cloud, identify some key geometric features (primitives), match the features across point clouds, and generate an optimal hypothesis using a minimal set of correspondences using a RANdom SAmple Consensus (RANSAC) procedure. The coarse registration obtained by global methods is usually followed by local non-linear refinement. Global methods, unlike local methods, do not require initialization. However, global methods can suffer from incorrect and insufficient correspondences. The geometric primitives typically used in global methods are either points, lines, or planes.

Several global registration methods using homogeneous and heterogenous correspondences are known. For example, it is possible to determine a closed-form solution for the registration given point-to-point, line-to-line, plane-to-plane, point-to-line, point-to-plane, or line-to-plane correspondences. One method obtains a global optimal solution from point-to-point, point-to-line, and point-to-plane correspondences using branch-and-bound. Another method uses branch-and-bound to obtain the optimal correspondences as well as transformation for the point-to-point registration problem.

SLAM Using 3D Sensors

In mobile robotics, some 3D-sensor-based methods use a simultaneous localization and mapping (SLAM) system for determining a motion of the sensor as well as reconstructing a scene structure. Those methods typically use geometric features such as point, line, or plane primitives. 3D sensors that provide a planar slice of 3D data, such as 2D laser scanners or ultrasonic sensors, can be used for determining planar, three degrees-of-freedom (DOF) motion. 3D sensors that provide full 3D point clouds, such as structured light scanners, 2D laser scanners attached on moving stages, and the Kinect sensor can be used for determining six DOF motion.

RGB-D mapping extracts keypoints from RGB images, back-projects the points in 3D using depth maps, and uses three point-to-point correspondences to determine an initial estimate of the pose using the RANSAC procedure, which is further refined using the ICP method.

Another method uses three plane-to-plane correspondences in a SLAM system with 3D sensors. That method addresses the correspondence problem using geometric constraints between planes.

Another method uses a combination of smaller field-of-view (FOV) 3D sensor and a larger FOV 2D laser scanner for the SLAM system using both planes and line segments as primitives. That method is designed for a sequential SLAM system that solves a local registration problem, and cannot solve global registration.

KinectFusion registers a current depth map with a virtual depth map generated from a global truncated signed distance function (TSDF) representation by using a coarse-to-fine ICP method. The TSDF representation integrates all previous depth maps registered into a global coordinate system, and enables higher-quality depth map generation than using a single image.

Several other variants of the ICP method are known, but the variants still suffer from local minima issues when the two 3D point clouds are distinct. Registration methods or SLAM systems that solely depend on points suffer from insufficient or incorrect correspondences in textureless regions or regions with repeated patterns. Plane-based techniques suffer from degeneracy issues in scenes containing insufficient number of non-parallel planes.

With 3D sensors such as the Kinect sensor, line correspondences are difficult to obtain because of noisy or missing depth values around depth discontinuities.

SUMMARY OF THE INVENTION

The embodiments of the invention provide a method for registering data in two different coordinate systems. The method uses both points and planes as registration primitives. The method can be used by a simultaneous localization and mapping (SLAM) system using 3D sensors. The SLAM system is an application of our registration method.

With the method, it is possible to register 3D data sets in two different coordinate systems using any combination of at least three point and plane primitives, i.e., 3 planes, 2 planes and 1 point, 1 plane and 2 points, and 3 points. The method is particularly concerned with a set of mixed (heterogeneous) primitives, that is at least two 3D points and at least one 3D plane, or at least one 3D point and at least two 3D planes.

That is, the method can use a minimal set of three primitives and a RANSAC procedure to register 3D data and reconstruct a scene. Because the number of planes is significantly smaller than the number of points in 3D data, the RANSAC procedure used by the preferred embodiments uses a primitive combination involving more planes than points, e.g., minimally two planes and one point.

In contrast to prior art methods that mainly use points for registration, the present method has the following advantages. The correspondence search and registration is faster due to the smaller number of plane primitives, and can be performed in real time. The method produces plane-based 3D models that are more compact than point-based models. The method provides global registration without suffering from local minima, or initialization problems as in the prior art local registration methods.

BRIEF DESCRIPTION OF THE DRAWING

FIG. 4 is a schematic of a mixed plane and point based model according to embodiments of the invention.

DETAILED DESCRIPTION OF THE PREFERRED EMBODIMENTS

Figure 1:
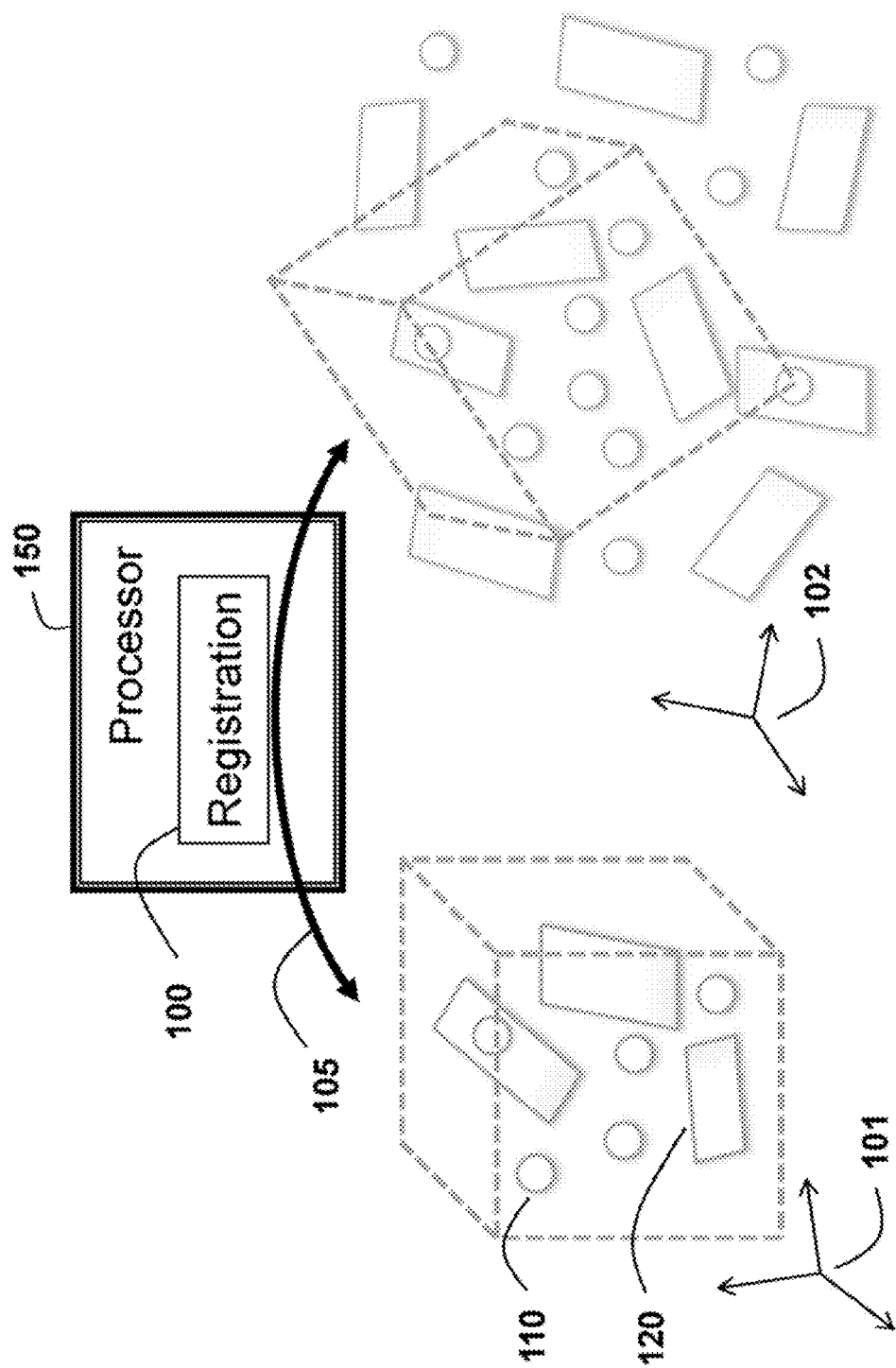
FIG. 1 is a schematic of a registration method according to embodiments of the invention.

The embodiments of the invention provide a method for registering 3D data in two different coordinate systems. As shown in FIG. 1, the method can be performed in a processor 150 connected to memory and input/output interfaces as known in the art.

FIG. 1 shows a schematic of the registration method 100. The registration method determines a 6-DOF rigid body transformation 105 between two different coordinate systems 101 and 102 by using two sets of at least three primitives selected from 3D data in the two different coordinate systems. The primitives include 3D points 110 and 3D planes 120. The three primitives in each set include at least one 3D plane, at least one 3D point, and a third primitive that can be either a point or a plane. Planes in the two sets are registered with planes, and points are registered with points. The registration method can be global and performed in real time.

Figure 2:
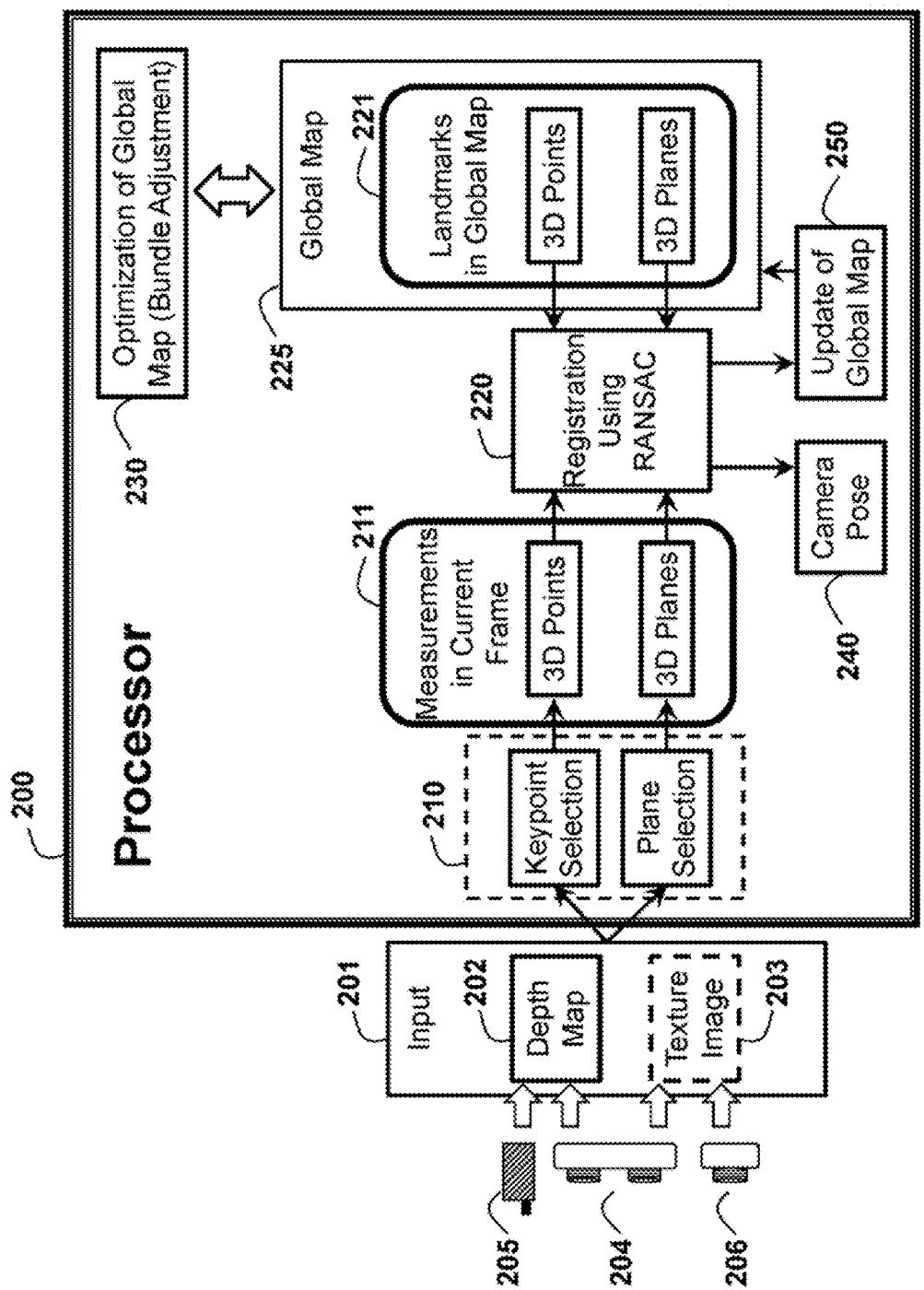
FIG. 2 is a flow diagram of a simultaneous localization and mapping (SLAM) system using the registration method according to embodiments of the invention.

The registration method can be used by a simultaneous localization and mapping (SLAM) system, as shown in FIG. 2. The SLAM system is an application of our registration method. The system can be implemented in a processor 200 connected to memory and input/output interfaces as known in the art. An example input 201 to the SLAM system is a set of one or more depth maps 202. A depth map describes a depth value (distance) of each pixel in the map, thus providing a 3D point cloud by back-projecting the pixels in the map according to their depth values. The SLAM system can optionally acquire a set of one or more 2D texture images 203 corresponding to the depth maps. The texture images can be grayscale or have RGB color channels. The depth maps can be acquired by a 3D sensor, e.g., a passive stereo camera 204 or an active IR or laser scanner 205, while the texture images can be acquired by a camera, e.g., a single camera in the stereo camera 204 or a dedicated camera 206. The 3D sensor and the camera can be hand-held by a human, or can be held by a machine, e.g., a robot arm or a mechanically moving stage.

The key concept is that the input can be acquired by movable sensors; our registration method determines the motion of the sensors and reconstructs a scene by registering 3D point clouds acquired at different viewpoints.

Our SLAM system selects 210 a set of 3D point and 3D plane primitives from the input (referred to as measurements 211) and registers 220 the points and planes with respect to a set of point and plane primitives in a global map 225 (referred to as landmarks 221). Each set includes at least one 3D point and at least one 3D plane. The third primitives in the sets can be either both points or both planes. The registration is performed by registering the points with points in the two sets, and the planes with planes in the two sets.

The SLAM system performs the registration method with a RANdom SAmple Consensus (RANSAC) procedure 220 using the minimal three primitives. Optimization 230 can be applied to the global map as additional inputs are acquired.

3D Points

Our SLAM system selects one or more keypoints in the 3D point cloud to obtain the 3D point primitives. The keypoints can be selected using 3D keypoint detectors from the 3D point cloud without using a texture image. Example 3D keypoint detectors include Normal Aligned Radial Feature (NARF) and 3D Speeded Up Robust Feature (SURF). Alternatively, the system can select 2D keypoints from each texture image using 2D keypoint detectors and back-project the keypoints using the corresponding depth value to obtain the 3D point primitives. Example 2D keypoint detectors include Scale-Invariant Feature Transform (SIFT) and Speeded Up Robust Feature (SURF). Those 3D and 2D keypoint detectors also provide a feature descriptor for each detected keypoints.

Each point primitive is represented by a position $p_m$ and a descriptor $D_m$, $(p_m, D_m)$ of a keypoint. The descriptor can be used for matching the 3D point primitives between the measurements and landmarks.

3D Planes

To select planes from the 3D point cloud, we use the following iterative procedure:

1. Randomly select a set of reference points in the 3D point cloud;
2. Determine an optimal plane for each reference point using nearby points inside a local window;
3. Determine all inliers that form a connected component with the reference point with respect to a grid graph of the depth map;
4. Identify an optimal plane with a sufficient and maximum number of inliers; and
5. Remove inliers from the 3D point cloud.

Each plane primitive is represented by plane parameters $\pi_m$ and a set of inliers $I_m$. The plane parameters form a 4D vector $\pi_m = (n_m^T, d_m)^T$, where $n_m$ is a unit normal vector, and $d_m$ is a distance to the origin of the coordinate system.

Registration

A pose 240 of the sensor i.e., a 6-DOF rigid body transformation with respect to a coordinate system of the global map) is determined by registering the primitives in the measurements with respect to the primitives in the landmarks in the global map. Our registration method using both points and planes and our RANSAC procedure are described below.

Map Update

Our SLAM system updates 250 the global map by adding point and plane primitives selected from keyframes. The current frame is considered a keyframe only if the pose is sufficiently different from previous keyframes (e.g., the translation and rotation of the current frame are different from the translations and rotations of previous keyframes by more than predetermined thresholds). Each point landmark is represented by the position $p_l$ and the descriptor $D_l$ as $((p_l, D_l))$. Each plane landmark is represented by plane parameters $\pi_l = (n_l^T, d_l)^T$ and a set of inliers $I_l$ as $((\pi_l, I_l))$.

Map Optimization

To jointly refine the registration between all keyframes, our SLAM system performs optimization 230 by bundle adjustment, using both the points and the planes. The bundle adjustment is performed in a separate thread asynchronously from a main thread for tracking the camera pose using the registration method. The details of the bundle adjustment are described below.

Registration Using Points and Planes

Our registration method uses point-to-point and plane-to-plane correspondences and provides a closed-form solution. The method is applicable to three or more correspondences. Thus, the method can be used to generate hypotheses using the minimal number of three correspondences in our RANSAC procedure, as well as to refine the initial hypothesis given by the RANSAC procedure using all inlier correspondences.

Closed-Form Solution for Mixed Point-to-Point and Plane-to-Plane Correspondences Let $\{p_i\}$ and $\{p'_i\}$, $i=1, \ldots, M$, be corresponding 3D points, and $\{\pi_j = (n_j^T, d_j)^T\}$ and $\{\pi'_j = (n'_j{}^T, d'_j)^T\}$, $j=1, \ldots, N$, be corresponding 3D planes in two different coordinate systems. We determine a 6-DOF rigid body transformation [R, t] between the coordinate systems, where R is a 3×3 rotation matrix and t is a 3×1 translation vector.

Solutions for Individual Cases

For point-to-point correspondences, the rotation and translation components can be decoupled. Let $$\overline{p} = \frac{1}{M}\sum_i p_i \text{ and } \overline{p}' = \frac{1}{M}\sum_i p'_i$$

be the centroids of the 3D point sets, and $q_i = p_i - \overline{p}$ and $q'_i = p'_i - \overline{p}'$. Then, a least-squares solution for the rotation that minimizes the error $$\sum_i \|q'_i - Rq_i\|^2 \quad (1)$$

is obtained by using quaternion representation of rotation or singular value decomposition (SVD). Using the estimated rotation $\hat{R}$, the translation is a difference between the rotated centroids $$\hat{t} = \overline{p}' - \hat{R}\overline{p}. \quad (2)$$

For the plane-to-plane correspondence case, the rotation is obtained by minimizing the error $$\sum_j \|n'_j - Rn_j\|^2, \quad (3)$$

which can be solved similar to the case of point-to-point correspondences. For determining the translation, we can stack the following liner constraint for three or more planes and solve the linear system:

$$n'_j{}^T t = d'_j - d_j. \quad (4)$$

Here, $^T$ is a transpose operator.

Solution for Mixed Case

For the mixed case, we have point-to-point and plane-to-plane correspondences. We exploit the decoupling used in the individual cases to determine the rotation and the translation. To determine the rotation, we combine Eqs. (1) and (3) as $$\sum_i \|q'_i - Rq_i\|^2 + \sum_j w_j \|n'_j - Rn_j\|^2, \quad (5)$$

where $w_j$ are the weights for planes, which can change for each plane correspondence. Eq. (5) shares the same form as Eqs. (1) and (3), and the optimal rotation is obtained in the same manner. Specifically, we define a 3×3 correlation matrix K as $$K = \sum_i q'_i q_i^T + \sum_j w_j n'_j n_j^T. \quad (6)$$

Let $K = UDV^T$ be a singular value decomposition (SVD) of K. Then, the optimal rotation $\hat{R}$ is $$\hat{R} = U \begin{pmatrix} 1 & & \\ & 1 & \\ & & \det(UV^T) \end{pmatrix} V^T. \quad (7)$$

To determine the translation t, we minimize the following error:

$$M\|t - (\overline{p}' - \hat{R}\overline{p})\|^2 + \sum_j w_j (n'_j{}^T t - (d'_j - d_j))^2. \quad (8)$$

This corresponds to defining a linear system $$\underbrace{\begin{pmatrix} 1 & & \\ & 1 & \\ & & 1 \\ n'_1{}^T & & \\ \vdots & & \\ n'_N{}^T & & \end{pmatrix}}_{A} t = \underbrace{\begin{pmatrix} \overline{p}' - \hat{R}\overline{p} \\ d'_1 - d_1 \\ \vdots \\ d'_N - d_N \end{pmatrix}}_{b}, \quad (9)$$

with a diagonal weight matrix $W = \text{diag}(M, M, M, w_1, \ldots, w_N)$. Then, a weighted least-squares solution is $t = (A^T W A)^{-1} A^T W b$.

Degeneracy Issues

To uniquely select R and t, the correlation matrix K in Eq. (6) and matrix A in Eq. (9) should satisfy certain conditions. To uniquely determine R, the rank of the correlation matrix K should be greater than one, and at least one of the following conditions should be true:
1. $\det(UV^T) = 1$.
2. The minimum singular value of K is a simple root.

For the translation t to be uniquely determined, the matrix A in Eq. (9) should be rank three.

The matrices K and A satisfy the above properties if the correspondences possess at least one of the following: 3 planes, 2 planes and 1 point, 1 plane and 2 points, and 3 points.

In the RANSAC procedure in our SLAM system, we use these minimal numbers of correspondences to generate hypotheses.

RANSAC Procedure

In contrast to correspondences just in a 2D image space, our 3D primitives provide several invariants that can be used to identify false matches. Given corresponding points and planes in two different coordinate systems, certain geometric entities determined in one coordinate system should substantially match the corresponding entities in the second coordinate system.

We identify the following three invariants in each coordinate system: I1 based on the distance between two points; I2 based on the distance between a point and a plane; and I3 based on the angle between two plane normals.

Corresponding geometric primitives can be associated with an invariant vector $I=(i_1,i_2,i_3)$, where $i_1$, $i_2$, and $i_3$ correspond to the number of invariants with respect to the type I1, I2, and I3, respectively.

All the corresponding triplets involving points and planes possess a total of three invariants: 3 points: $I=(3,0,0)$; 1 plane and 2 points; $I=(1,2,0)$; 2 planes and 1 point: $I=(0,2,1)$; and 3 planes: $I=(0,0,3)$.

An interpretation tree or a branch-and-bound method can be used to identify false matches using these invariants. For our RANSAC procedure, we use a simple interpretation-tree-based pruning.

Figure 3:
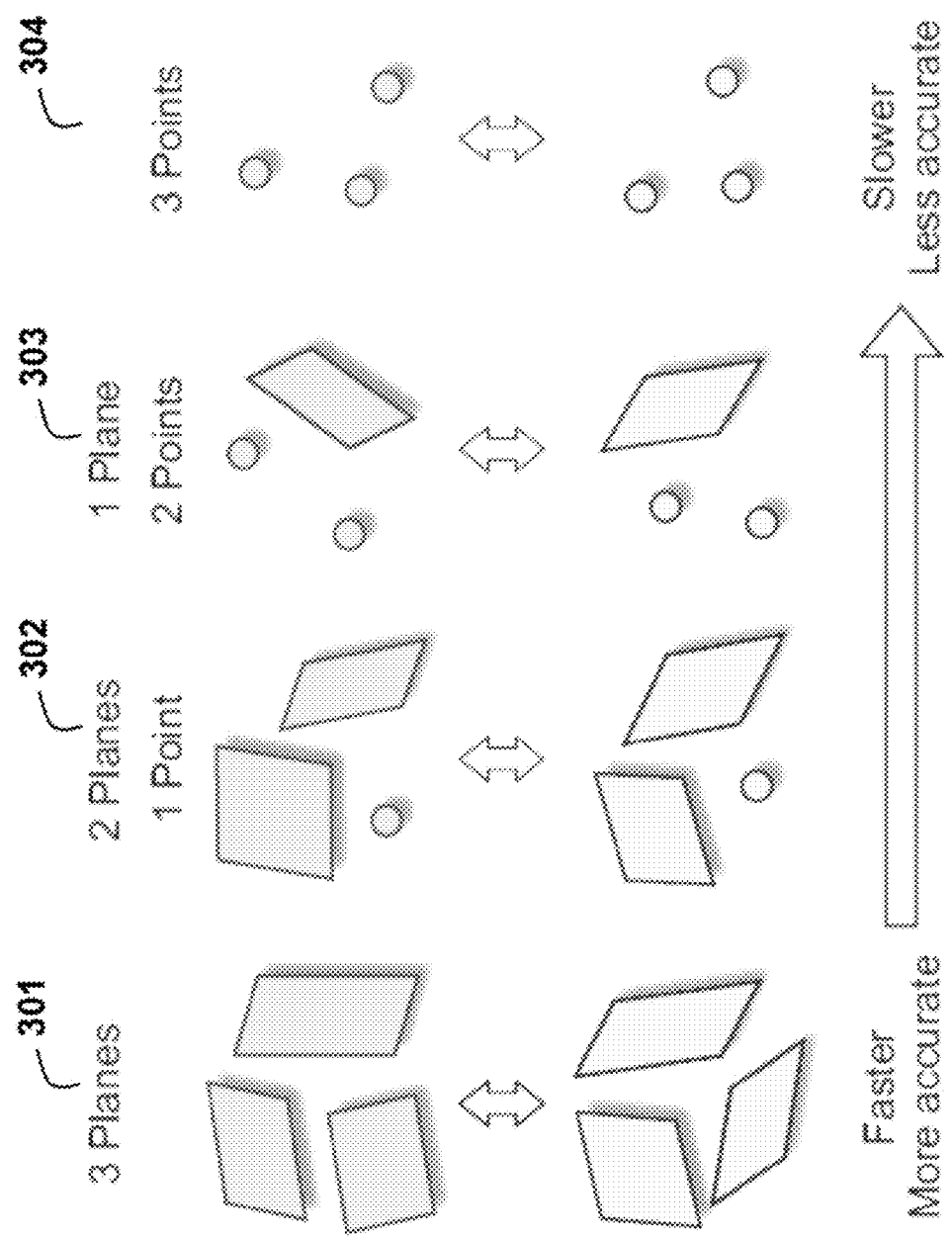
FIG. 3 is a schematic of a RANSAC procedure used by embodiments of the invention.

Prior to deleting mismatches based on the invariants, we obtain some initial correspondences. In the case of points, we use the SURF descriptors to obtain the correspondences. In the case of planes, we start with all possible correspondences and delete the mismatches based on the invariants. The RANSAC procedure that uses three planes is much faster than the one using three points because the number of planes in 3D data is usually much smaller than the corresponding number of points. Moreover, because planes are generated by many points, planes are less affected by noise in 3D data, leading to a more accurate registration. Therefore, as shown in FIG. 3, we initialize the RANSAC procedure with a triplet of primitives, if available, in the following preferred order: 3 planes 301, 2 planes and 1 point 302, 1 plane and 2 points 303, or 3 points 304.

A termination condition for the RANSAC procedure can be a predetermined minimal number of correspondences to be sampled.

Bundle Adjustment with Points and Planes

Our SLAM system optimizes the following variables in the bundle adjustment: Point landmarks $p_l^i=(x^i,y^i,z^i)$, plane landmarks $\pi_l^j=(a^j,b^j,c^j,d^j)$, and keyframe poses $T^k=(t_x^k,t_y^k,t_z^k,\theta_x^k,\theta_y^k,\theta_z^k)$.

Here, $t^k=(t_x^k,t_y^k,t_z^k)$ are the (x,y,z) components of the translation of the kth keyframe, and $\theta^k=(\theta_x^k,\theta_y^k,\theta_z^k)$ represent the rotation around (x,y,z) axes. The rotation matrix $R^k$ of the kth keyframe is represented by $R^k=R_z(\theta_z^k)R_y(\theta_y^k)R_x(\theta_x^k)$.

We determine a Jacobian matrix using point/plane primitives associated with each point/plane landmark as follows.

Point Landmarks

For point landmarks, we minimize an Euclidean distance error between a point landmark $p_l^i$ and an associated point $p_m^k=(x_m^k,y_m^k,z_m^k)$ in the $k^{th}$ keyframe, which is $$\|p_l^i-(R^k p_m^k+t^k)\|=0. \quad (10)$$

Using the current estimate of the landmark $\hat{p}_l^i=(\hat{x}^i,\hat{y}^i,\hat{z}^i)$ and the keyframe pose $[\hat{R}^k,\hat{t}^k]$, we linearize Eq. (10) as $$\|\hat{p}_l^i+\Delta p_l^i-(\Delta R^k \hat{p}_m^k+\Delta t^k)\|=0, \quad (11)$$

where $\hat{p}_m^k=\hat{R}^k p_m^k+\hat{t}^k$ and $$\Delta R^k = \begin{pmatrix} 1 & -\Delta\theta_z^k & \Delta\theta_y^k \\ \Delta\theta_z^k & 1 & -\Delta\theta_x^k \\ -\Delta\theta_y^k & \Delta\theta_x^k & 1 \end{pmatrix}. \quad (12)$$

From Eq. (11), we obtain three equations separately for each (x,y,z) component. The equation for the x component is $$\begin{pmatrix} 2(\hat{x}^i-\hat{x}_m^k) \\ 0 \\ 0 \\ 2(\hat{x}_m^k-\hat{x}^i) \\ 0 \\ 0 \\ 0 \\ 0 \\ 2\hat{z}_m^k(\hat{x}_m^k-\hat{x}^i) \\ 2\hat{y}_m^k(\hat{x}^i-\hat{x}_m^k) \end{pmatrix}^T \begin{pmatrix} \Delta x^i \\ \Delta y^i \\ \Delta z^i \\ \Delta t_x^k \\ \Delta t_y^k \\ \Delta t_z^k \\ \Delta \theta_x^k \\ \Delta \theta_y^k \\ \Delta \theta_z^k \end{pmatrix} = -(\hat{x}^i-\hat{x}_m^k)^2, \quad (13)$$

and those for the y and z components can be similarly obtained.

Plane Landmarks

For plane landmarks, we minimize a geometric error defined by a sum of distances between a plane landmark and 3D points sampled from associated planes in a keyframe. Specifically, we uniformly sample 3D points $x_m^{k,s}$ from inlier 3D points of a plane primitive $\pi_m^k$, and determine the distance between each sampled point and the associated plane landmark $\pi_l^j$. Thus, the geometric error we minimize is $$\sum_s (\pi_l^j)^T \begin{pmatrix} R^k x_m^{k,s}+t^k \\ 1 \end{pmatrix} = 0. \quad (14)$$

We linearize Eq. (14) using a current estimate of the plane landmark $\hat{\pi}_l^j=(\hat{a}^j,\hat{b}^j,\hat{c}^j,\hat{d}^j)$, and the keyframe pose $[\hat{R}^k,\hat{t}^k]$ as $$\sum_s (\pi_l^j+\Delta\pi_l^j)^T \begin{pmatrix} \Delta R^k \hat{x}_m^{k,s}+\Delta t^k \\ 1 \end{pmatrix} = 0, \quad (15)$$

where $\hat{x}_m^{k,s}=\hat{R}^k x_m^{k,s}+\hat{t}^k=(\hat{x}_m^{k,s},\hat{y}_m^{k,s},\hat{z}_m^{k,s})$. After simplification, we have $$\sum_s \begin{pmatrix} \hat{x}_m^{k,s} \\ \hat{y}_m^{k,s} \\ \hat{z}_m^{k,s} \\ 1 \\ \hat{a}^j \\ \hat{b}^j \\ \hat{c}^j \\ \hat{c}^j\hat{y}_m^{k,s}-\hat{b}^j\hat{z}_m^{k,s} \\ \hat{a}^j\hat{z}_m^{k,s}-\hat{c}^j\hat{x}_m^{k,s} \\ \hat{b}^j\hat{x}_m^{k,s}-\hat{a}^j\hat{y}_m^{k,s} \end{pmatrix}^T \begin{pmatrix} \Delta a^j \\ \Delta b^j \\ \Delta c^j \\ \Delta d^j \\ \Delta t_x^k \\ \Delta t_y^k \\ \Delta t_z^k \\ \Delta\theta_x^k \\ \Delta\theta_y^k \\ \Delta\theta_z^k \end{pmatrix} = -\sum_s (\hat{\pi}_l^j)^T \begin{pmatrix} \hat{x}_m^{k,s} \\ 1 \end{pmatrix}. \quad (16)$$

Geometric Constraints Between Plane Landmarks

Our SLAM system can optionally enforce geometric constraints between plane landmarks in the bundle adjustment. The geometric constraints include parallelism and orthogonality. Orthogonal or parallel planes can be commonly observed in man-made environments, where enforcing the geometric constraints is useful to obtain an accurate registration.

For every pair of plane landmarks, $\pi_i^j=(a^j,b^j,c^j,d^j)$ and $\pi_i^{j'}=(a^{j'},b^{j'},c^{j'},d^{j'})$, we check whether the angle between normal vectors of the two planes is sufficiently close to 0 degrees (parallel) or 90 degrees (orthogonal) using a predetermined threshold. If true, then we enforce the following constraint $$a^j a^{j'} + b^j b^{j'} + c^j c^{j'} = S, \quad (17)$$

where S=1 if the two planes are sufficiently close to parallel, while S=0 if the two planes are sufficiently close to orthogonal.

Using current estimates of the two plane landmarks, $\hat{\pi}_i^j=(\hat{a}^j,\hat{b}^j,\hat{c}^j,\hat{d}^j)$ and $\hat{\pi}_i^{j'}=(\hat{a}^{j'},\hat{b}^{j'},\hat{c}^{j'},\hat{d}^{j'})$, we linearize Eq. (17) as $$(\hat{a}^j + \Delta a^j)(\hat{a}^{j'} + \Delta a^{j'}) + \quad (18)$$
$$(\hat{b}^j + \Delta b^j)(\hat{b}^{j'} + \Delta b^{j'}) + (\hat{c}^j + \Delta c^j)(\hat{c}^{j'} + \Delta c^{j'}) = S.$$

After simplification, Eq. (18) results in $$\begin{pmatrix} \hat{a}^{j'} \\ \hat{b}^{j'} \\ \hat{c}^{j'} \\ \hat{a}^j \\ \hat{b}^j \\ \hat{c}^j \end{pmatrix}^T \begin{pmatrix} \Delta a^j \\ \Delta b^j \\ \Delta c^j \\ \Delta a^{j'} \\ \Delta b^{j'} \\ \Delta c^{j'} \end{pmatrix} = S - \left(\hat{a}^{j'}\hat{a}^j + \hat{b}^{j'}\hat{b}^j + \hat{c}^{j'}\hat{c}^j\right). \quad (19)$$

Solution

Stacking Eqs. (13), (16), and (19) for all landmarks and keyframes results in a linear system $J\Delta = -\epsilon_0$, where the Jacobain matrix is J, the error vector is $\epsilon_0$, and the update vector is $\Delta = (\Delta p_l^i, \Delta \pi_l^j, \Delta T^k)$. We use a Gauss-Newton method to solve the optimization problem.

Implementation

Our real-time SLAM system uses texture images and depth maps having a 640×480 pixel resolution. We visualize the point and plane landmarks superimposed onto the current point cloud when the registration is successful. Our SLAM system always determines the global registration frame-by-frame with respect to the global map. Thus, registration failures do not affect subsequent inputs. Our SLAM system provides reconstructed plane landmarks as a plane-based representation of the scene, which is more compact and provides more semantic information than a point-based representation of the scene.

EFFECT OF THE INVENTION

The invention provides a registration method that uses both points and planes as primitives to register 3D data in two different coordinate systems. Using the registration method, a real-time SLAM system for 3D sensors that uses both point-to-point and plane-to-plane correspondences for registration is developed. Using both primitives enables faster and more accurate registration than only using points. Our SLAM system generates a 3D model as a set of planes, which provides more compact and semantic information of the scene than, strictly point-based representations.

The invention shows that any combination of three 3D point/plane primitives allows for registration between two different coordinate systems. The invention also shows a bundle-adjustment framework that uses both 3D points and 3D planes to jointly optimize the registration between multiple coordinate systems. The bundle-adjustment framework can enforce geometric constraints between 3D planes, such as parallelism and orthogonality, to further improve the registration accuracy for man-made environments.

The use of planes enables both faster reconstruction and compact modeling. Local methods, such as iterative-closest point (ICP) methods, are prone to local minima issues under fast motion of the 3D sensor, while our registration method provides a global solution and avoids local minima problems.

The method is different from methods that extract plane primitives from 3D point clouds that are already registered. Instead, the method uses plane and point primitives selected from individual 3D point cloud for registration. Using planes with points in the registration enables a more efficient and accurate registration than using only points.

As shown in FIG. 4, the output of our SLAM system is a registered point cloud 401 and a plane-based representation 402 of the scene. The plane-based representation provides more compact and semantic information than the point-based representation. The representation is generated in real time.

Because the invention uses both points and planes, failures present in prior art methods are avoided. This mixed mode registration is novel.

A closed-form solution to registration is provided for point-to-point and plane-to-plane correspondences in a unified manner.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for registering data, wherein the data have three dimensions, comprising the steps of:
   selecting a first set of primitives from the data in a first coordinate system, wherein the first set of primitives includes at least one plane, at least one point, and a third primitive that is either a point or a plane;
   selecting a second set of primitives from the data in a second coordinate system, wherein the second set of primitives includes at least one plane, at least one point, and a third primitive corresponding to the third primitive in the first set of primitives;
   determining a six degrees of freedom rigid body transformation [R, t] between the first coordinate system and the second coordinate system minimizing an error metric formed by a combination of a point-to-point error metric and a plane-to-plane error metric, wherein the point-to-point error metric includes a distance between the point in the first coordinate system and the point in the second coordinate system transformed with the six degrees of freedom rigid body transformation, and wherein the plane-to-plane error metric includes a distance between the plane in the first coordinate system and the plane in the second coordinate system transformed with the six degrees of freedom rigid body transformation; and registering, in the first and second set of primitives, planes with each other and points with each other to obtain registered primitives including registered points and registered planes, such that coordinates of the registered points are matched with each other, and normals of the registered planes and distances between the registered planes and an origin of the first or the second coordinate system are matched with each other, using the six degrees of freedom rigid body transformation wherein R in the six degrees of freedom rigid body transformation is a rotation matrix and t is a translation vector, wherein the registering is used in a simultaneous localization and mapping system wherein steps of the method are performed by a processor wherein the data has been acquired as a depth map acquired by a sensor.

2. The method of claim 1, wherein the registering is global.

3. The method of claim 1, wherein the registering is in real time.

4. The method of claim 1, further comprising:
acquiring the data as a depth map.

5. The method of claim 4, wherein the depth map is acquired by a 3D sensor.

6. The method of claim 5, wherein the 3D sensor is moveable during the acquiring.

7. The method of claim 4, further comprising:
maintaining the registered primitives in a global map.

8. The method of claim 7, wherein the global map is optimized by bundle adjustment using the points and the planes.

9. The method of claim 8, wherein the bundle adjustment enforces geometric constraints between the planes.

10. The method of claim 4, wherein the registering uses a random sample consensus procedure.

11. The method of claim 4, further comprising:
representing each point by a position and a descriptor, and each plane by a unit normal vector and a distance to an origin of the corresponding coordinate system.

12. The method of claim 4, wherein each plane is selected by:
randomly selecting a set of reference points in a 3D point cloud;
determining an optimal plane for each reference point using nearby points inside a local window;
determining all inliers that form a connected component with the reference point with respect to a grid graph of the depth map;
identifying an optimal plane with a predetermined number of the inliers; and
removing the inliers from the 3D point cloud.

13. The method of claim 4, wherein each point is selected by a 3D keypoint detector.

14. The method of claim 4, further comprising:
acquiring a texture image corresponding to the depth map.

15. The method of claim 14, wherein each point is selected by a 2D keypoint detector applied to the texture image and back-projecting detected keypoints using the depth map.

16. The method of claim 15, wherein the texture image is acquired by a camera.

17. The method of claim 1, further comprising:
identifying false matches during the registering based on: a distance between points; a distance between a point and a plane; or an angle between normals of two planes in each coordinate system.

18. The method of claim 1, wherein an output of the method includes a registered point cloud and a plane-based representation of a scene.

19. The method of claim 1, wherein the error metric includes $$\sum_i \|q'_i - Rq_i\|^2 + \sum_j w_j \|n'_j - Rn_j\|^2,$$

wherein i and j are positive integers, q' is the point in the first coordinate system, q is the point in the second coordinate system, n' is the plane in the first coordinate system, n is the plane in the second coordinate system, and w is a weight for corresponding planes.

20. The method of claim 19, wherein w changes for each corresponding planes.

* * * * *